2 Sheets—Sheet 2.
W. B. GRABLE & C. K. PICKLES.
WAREHOUSE-TRUCK.
No. 194,236. Patented Aug. 14, 1877.
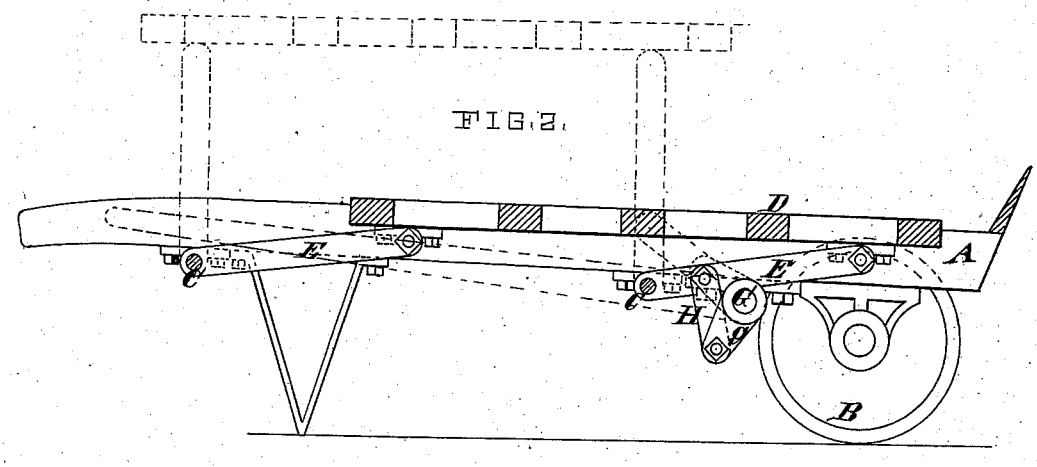
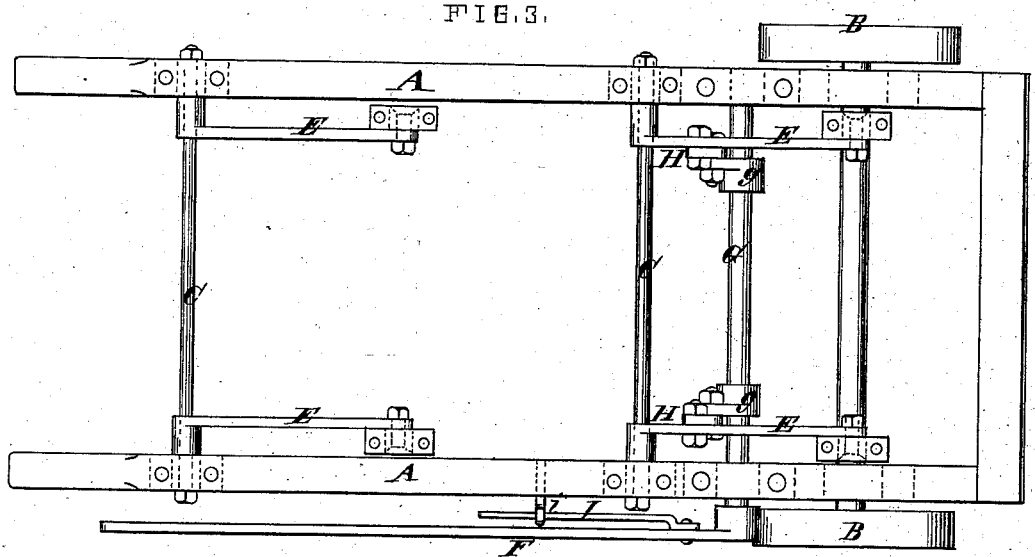
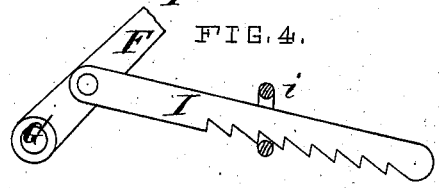
ATTEST.
Robert Burns
C. K. Pickles
INVENTORS.
W. B. Grable
Chas. K. Pickles

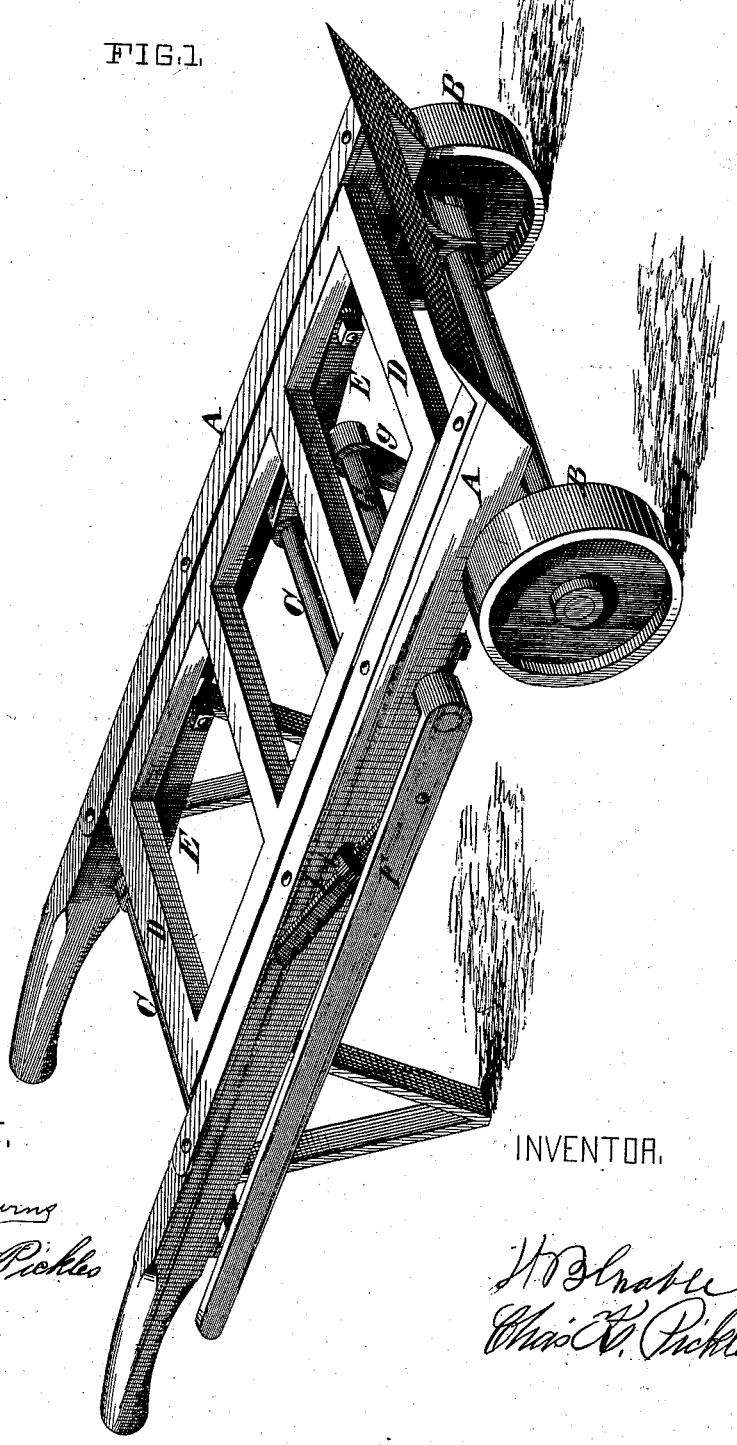

UNITED STATES PATENT OFFICE.

WILLIAM B. GRABLE AND CHARLES K. PICKLES, OF ST. LOUIS, MISSOURI.

IMPROVEMENT IN WAREHOUSE-TRUCKS.

Specification forming part of Letters Patent No. 194,236, dated August 14, 1877; application filed April 28, 1877.

*To all whom it may concern:*

Be it known that we, WILLIAM B. GRABLE and CHARLES K. PICKLES, of the city and county of St. Louis, and State of Missouri, have invented certain Improvements in Warehouse-Trucks, of which the following is a full, clear, and exact description, reference being had to the accompanying drawings, and to the letters of reference marked thereon.

This invention relates to an improved construction of warehouse-trucks, so as to enable the person to raise and lower the platform of the truck in loading or unloading wagons, and in piling up merchandise; and this invention consists in pivoting a platform on the end of links that are journaled on the cross-rods of the truck. The links are operated to raise and lower the platform by a hand-lever keyed to a rock-shaft that has pitman-connection to one pair of links, as will hereinafter more fully appear.

In the drawings, Figure 1 is a perspective view. Fig. 2 is a longitudinal section, showing the platform raised in dotted lines. Fig. 3 is a top view with platform removed. Fig. 4 is a detail of mechanism for locking the platform at any desired elevation.

A are the side bars of the truck, to which the wheels B are journaled. C are the cross-rods that secure the side bars A together. D is the platform of the truck. This platform is journaled to the upper end of the links E, which, at their lower ends, are journaled to the cross-rods C of the truck proper. F is the operating-handle keyed to the rock-shaft G, which carries arms $g$, having pitman-connection H to the links E. I is a notched bar, pivoted to the handle F, and sliding in an eye, $i$, turning in the side of the bar A, the purpose being to engage one of the notches of the bar in the side of the eye to retain the platform at any desired elevation.

By this construction the device can be used in the same manner as the usual trucks for ordinary purposes, and when it is desired to load or unload wagons, or to pile up or take down goods, the platform can be raised to the desired height to receive the load, or to load it onto the wagon, as the case may be, the platform being retained in this position as long as desired by the locking arrangement I $i$.

Our improved construction can be readily and cheaply applied to trucks in ordinary use.

Having thus fully described our invention, what we claim, and desire to secure by Letters Patent, is—

The combination of the truck A B, movable platform D, links E, operating-lever F, rock-shaft G, arms $g$, and pitman H, as and for the purpose set forth.

W. B. GRABLE.
CHARLES K. PICKLES.

Witnesses:
WILLIAM A. TAYLOR,
ROBERT BURNS.